United States Patent [19]

Konno

[11] Patent Number: 5,734,488
[45] Date of Patent: Mar. 31, 1998

[54] LIGHT SCANNING OPTICAL SYSTEM

[75] Inventor: Masaaki Konno, Kanagawa-ken, Japan

[73] Assignee: Fuji Photo Film Co., Ltd., Kanagawa-ken, Japan

[21] Appl. No.: 655,977

[22] Filed: May 31, 1996

[30]     Foreign Application Priority Data

Jun. 1, 1995 [JP] Japan ..................... 7-135286

[51] Int. Cl.$^6$ ................................... G02B 26/08
[52] U.S. Cl. ..................... 359/204; 359/855; 347/242
[58] Field of Search ........................ 359/204, 855; 250/234, 235, 236; 347/238, 241, 242, 243, 256, 257

[56]         References Cited

U.S. PATENT DOCUMENTS 4,884,857  12/1989  Prakash et al. .................. 359/204

FOREIGN PATENT DOCUMENTS 63-307418  12/1988  Japan .

Primary Examiner—Paul M. Dzierzynski
Assistant Examiner—Darren E. Schuberg

[57]         ABSTRACT

A light scanning optical system includes a plurality of lasers spaced from each other and a deflector which deflects laser beams emitted from the lasers so that the laser beams scan a recording medium while forming beam spots on the recording medium spaced from each other in the scanning direction. A plurality of reflecting surfaces which are provided on a single base body to reflect the respective laser beams toward the deflector at different angles is disposed on the optical path of the laser beams between the lasers and the deflector.

5 Claims, 2 Drawing Sheets

F I G. 2
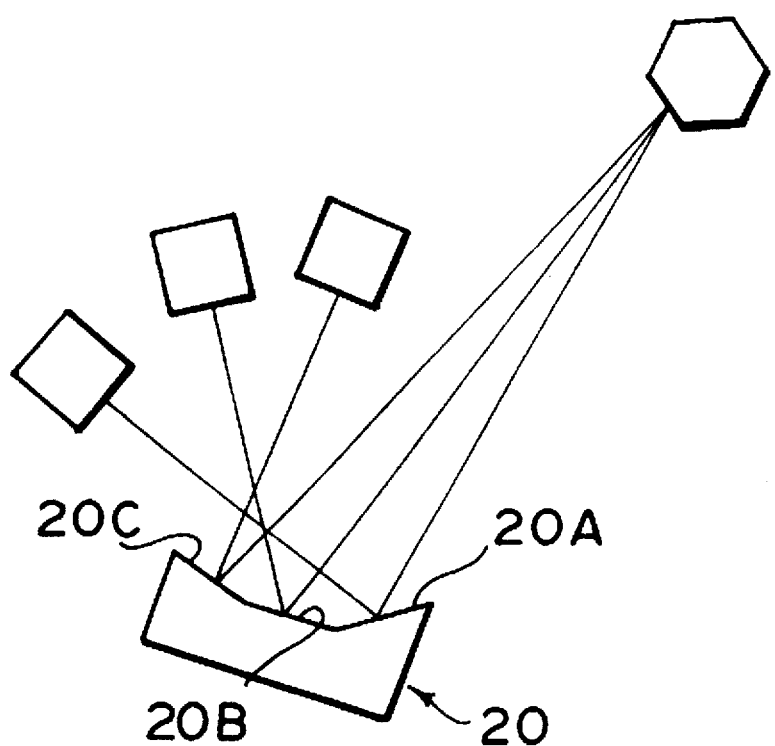

LIGHT SCANNING OPTICAL SYSTEM

BACKGROUND OF THE INVENTION

1. Field of the Invention

This invention relates to a light scanning optical system for scanning a recording medium with a plurality of laser beams emitted from a plurality of lasers.

2. Description of the Related Art

There has been proposed a system for recording an image using a plurality of lasers. For example, there has been proposed an image recording system in which red, green and blue laser beams emitted from respective lasers (laser diode or SHG laser) are modulated by an acoustooptic modulator, the modulated laser beams are reflected by respective dichroic mirrors to travel along a single optical axis as one laser beam, and the laser beam is deflected by a deflector such as a rotary polygonal mirror to scan a photosensitive recording medium through an fθ lens. In such a system, a horizontal period sensor is disposed in front of the recording medium and image recording is timed on the basis of a periodic signal generated from the detecting signal of the horizontal period sensor.

In such an image recording system, it is very difficult to realize an optical system which can accurately superimpose the red, green and blue laser beams and accordingly the beam spots of the three laser beams cannot accurately coincide with each other on the recording medium, which results in deviation of the color to be formed by the laser beams from a desired color or deterioration in resolution of the image or characters.

In order to overcome such problems, there has been proposed an image recording system in which the laser beams are separately focused on the recording medium by providing a laser beam reflecting means between the lasers and the deflecting means and causing the laser beams to impinge upon the reflecting surface of the deflecting means at different angles. See Japanese Unexamined Patent Publication No. 63(1988)-307418.

In such an image recording system, the three laser beams impinge upon the recording medium at a certain angle to each other. However since the laser beams must be passed through one fθ lens, the angles between the laser beams cannot be so large in view of the characteristics of the fθ lens and the optical system is arranged so that the angles between the laser beams are substantially 4° at the reflecting means.

The size of such an image recording system, where a reflecting means is provided on the optical path of the laser beams between the lasers and the deflecting means, can be miniaturized to some extent. However the image recording system is disadvantageous in that when the reflecting means expands with heat, for instance, due to change in the environmental temperature, the reflecting angles of the laser beams change and the laser beams cannot be focused in place on the recording medium, which results in deviation of the color to be formed by the laser beams from a desired color or deterioration in resolution of the image or characters.

SUMMARY OF THE INVENTION

In view of the foregoing observations and description, the primary object of the present invention is to provide a light scanning optical system which can form beam spots in place on a recording medium.

Another object of the present invention is to provide a light scanning optical system which can be short in optical path and accordingly can be small in size.

The light scanning optical system in accordance with the present invention comprises a plurality of lasers spaced from each other and a deflecting means which deflects laser beams emitted from the lasers so that the laser beams scan a recording medium while forming beam spots on the recording medium spaced from each other in the scanning direction and is characterized in that a reflecting means having a plurality of reflecting surfaces which are provided on a single base body to reflect the respective laser beams toward the deflecting means at different angles is disposed on the optical path of the laser beams between the lasers and the deflecting means.

That is, in the light scanning system of the present invention, a reflecting means having a plurality of reflecting surfaces integrally provided on a single base body is disposed between the lasers and the deflecting means.

It is preferred that the lasers be oriented so that the laser beams emitted therefrom intersect each other before impinging upon the reflecting means, and the reflecting means reflects the laser beams so that the reflected laser beams impinge upon the deflecting means at angles, e.g., about 4°, to each other smaller than the angles at which the laser beams intersect each other before impinging upon the reflecting means.

Further it is preferred that the base body of the reflecting means be formed of a material such as glass which is small in thermal expansion coefficient. When the reflecting surfaces are formed by bonding reflecting members to a base body, it is preferred that the reflecting members be bonded to the base body by adhesive which is small in thermal expansion coefficient or in thermal shrinkage coefficient.

In the light scanning system of the present invention where the reflecting surfaces of the reflecting means are formed on a single base body, the respective reflecting surfaces are shifted from the original positions by substantially the same amount with a change in environmental temperature and accordingly the relation between the beam spots of the laser beams on the recording medium is kept unchanged even if the environmental temperature changes, whereby deterioration in resolution of the image or characters recorded on the recording medium can be prevented.

Further when the reflecting means is arranged to reflect the laser beams so that the angles between the laser beams become smaller after reflection than before reflection and the laser beams impinge upon the deflecting means at a desired angle, e.g., about 4°, to each other, the lasers may be positioned so that the laser beams emitted therefrom are at relatively large angles to each other, whereby the length of the optical path between the reflecting means and each of the lasers can be relatively short. Further when the lasers are positioned so that the laser beams emitted therefrom intersect each other, the angles between the laser beams as emitted from the lasers can be further larger, and the length of the optical path between the reflecting means and each of the lasers can be shorter, whereby the overall optical path of the optical system can be relatively short and the size of the overall recording system can be relatively small even if relatively large lasers such as SHG lasers are employed as the lasers.

Further when the base body of the reflecting means is of a material which is low in thermal expansion, change in the reflecting angles with increase in temperature can be suppressed and shift of the laser beam spots on the recording medium can be suppressed.

Further when the reflecting members are bonded to the base body by adhesive which is small in thermal expansion coefficient or in thermal shrinkage coefficient, setting of the reflecting angles and manufacture of the reflecting means are facilitated and at the same time, change in the reflecting angles with increase in temperature can be suppressed and shift of the laser beam spots on the recording medium can be suppressed.

BRIEF DESCRIPTION OF THE DRAWINGS

FIG. 2 is a view showing a modification of the reflecting means employed in the light scanning system.

DESCRIPTION OF THE PREFERRED EMBODIMENT

Figure 1:
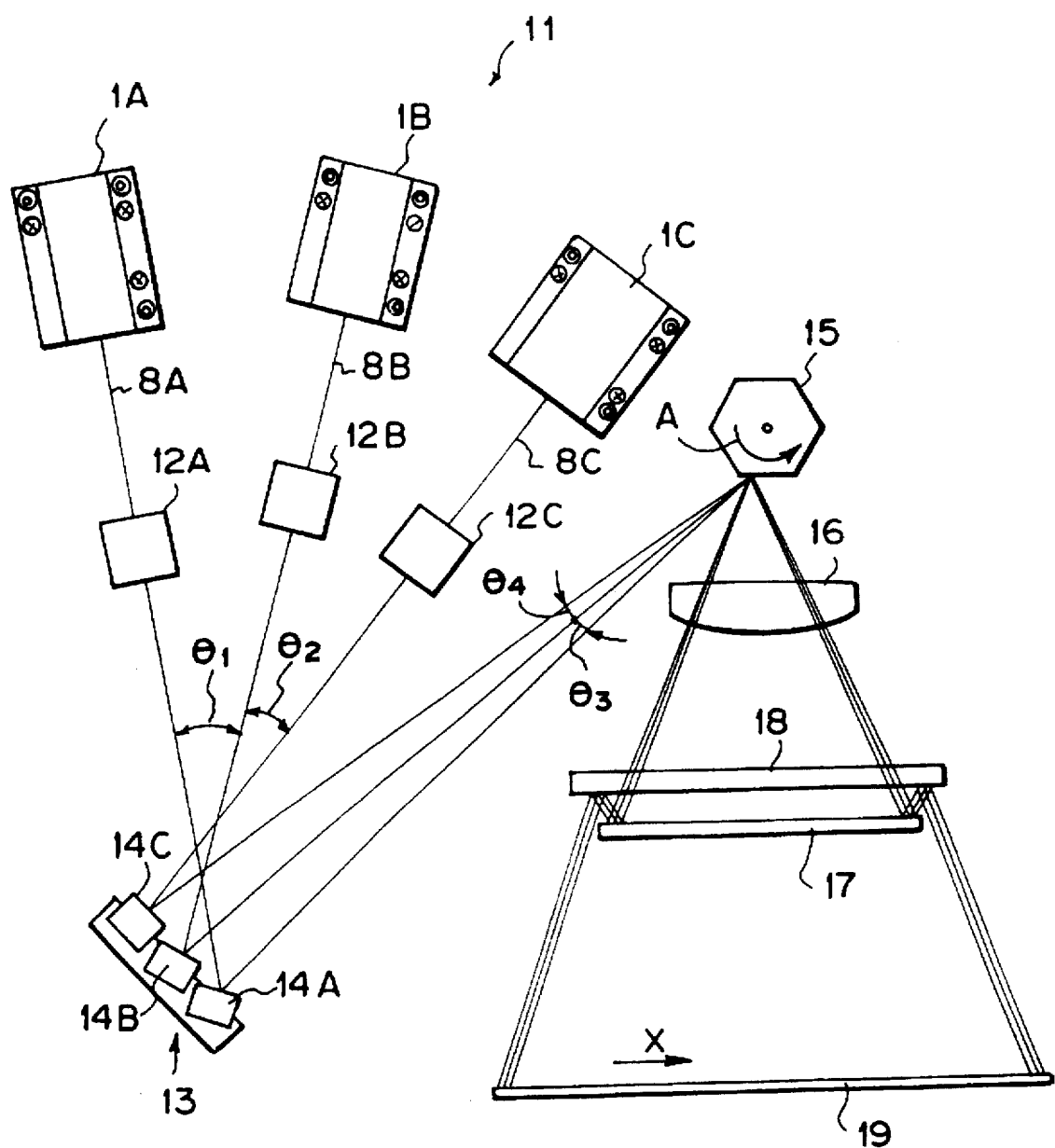
FIG. 1 is a schematic view showing a color image recording system provided with a light scanning system in accordance with an embodiment of the present invention.

In FIG. 1, a color image recording system 11 comprises a red laser 1A which may be a LD or a SHG, a green laser 1B which is a SHG, a blue laser 1C which is a SHG. The lasers 1A to 1C are mounted on an optical surface plate not shown. The color image recording system 11 further comprises acoustooptic modulators 12A, 12B and 12C for respectively modulating red, green and blue laser beams 8A, 8B and 8C respectively emitted from the lasers 1A, 1B and 1C, three reflecting mirrors 14A, 14B and 14C which are fixed to a base body 13 to respectively reflect the modulated laser beams 8A, 8B and 8C toward a rotary polygonal mirror 15 which is rotated in the direction of arrow A by a driving means such as a motor not shown, an fθ lens 16 which focuses the laser beams 8A, 8B and 8C deflected by the polygonal mirror 15 on a recording medium 19 and a pair of reflecting mirrors 17 and 18 disposed between the fθ lens 16 and the recording medium 19 to ensure a sufficient length of the optical paths of the laser beams 8A, 8B and 8C. The lasers 1A, 1B and 1C are positioned so that the laser beams 8A and 8B intersects each other at angle θ1 and the laser beams 8B and 8C intersects with each other at angle θ2. The reflecting mirrors 14A, 14B and 14C are positioned to respectively reflect the laser beams 8A, 8B and 8C so that the angle θ1 between the laser beams 8A and 8B is reduced to θ3 and the angle θ2 between the laser beams 8B and 8C is reduced to θ4. The angles θ1 and θ2 are set to about 14° and the angles θ3 and θ4 are set to about 4°.

The base body 13 is formed of a material which is small in thermal expansion coefficient such as glass, and the reflecting mirrors 14A, 14B and 14C are bonded to the base body 13 by adhesive which is small in thermal expansion coefficient and thermal shrinkage coefficient.

The color image recording system 11 operates as follows. The lasers 1A, 1B and 1C respectively emit red, green and blue laser beams 8A, 8B and 8C. The laser beams 8A and 8B are at θ1 to each other and the laser beam 8B and 8C at θ2 to each other. The laser beams 8A, 8B and 8C emitted from the lasers 1A, 1B and 1C enter the acoustooptic modulators 12A, 12B and 12c, respectively and are modulated according to the color of the image to be recorded. The modulated laser beams 8A, 8B and 8C are caused to impinge upon the reflecting means while intersecting each other. The reflecting mirrors 14A, 14B and 14C are fixed to the base body 13 to respectively reflect the laser beams 8A, 8B and 8C so that the angle θ1 between the laser beams 8A and 8B is reduced to θ3 and the angle θ2 between the laser beams 8B and 8C is reduced to θ4.

By thus reducing the angles θ1 and θ2 between the laser beams 8A, 8B and 8C to θ3 and θ4 by the reflecting means, the angles between the laser beams 8A, 8B and 8C as impinging upon the polygonal mirror 15 can be desired values such as about 4° even if the angles θ1 and θ2 between the laser beams 8A, 8B and 8C as emitted from the lasers 1A, 1B and 1C are relatively large and accordingly the lasers 1A, 1B and 1C may be positioned so that the laser beams 8A, 8B and 8C emitted therefrom are at relatively large angles to each other, whereby the length of the optical path between the reflecting means and each of the lasers 1A, 1B and 1C can be relatively short even if relatively large lasers are employed as the lasers 1A, 1B and 1C. Further when the lasers 1A, 1B and 1C are positioned so that the laser beams 8A, 8B and 8C emitted therefrom intersect each other, the angles θ1 and θ2 between the laser beams 8A, 8B and 8C as emitted from the lasers 1A, 1B and 1C can be further larger, and the length of the optical path between the reflecting means and each of the lasers 1A, 1B and 1C can be shorter, whereby the overall optical path of the optical system can be relatively short and the size of the overall recording system can be relatively small even if relatively large lasers such as SHG lasers are employed as the lasers 1A, 1B and 1C.

The laser beams 8A, 8B and 8C reflected by the reflecting mirrors 14A, 14B and 14C impinge upon the polygonal mirror 15 rotating in the direction of arrow A and are deflected by the polygonal mirror 15 to be focused on the recording medium 19 through the fθ lens 16, reflecting mirrors 17 and 18. Thus the laser beams 8A, 8B and 8C are caused to scan the recording medium 19 in the direction of arrow X (main scanning) while the recording medium 19 is conveyed in a direction perpendicular to the direction of arrow X (sub-scanning), whereby the recording medium 19 is two-dimensionally scanned with the laser beams 8A, 8B and 8C and a color image is recorded on the recording medium 19.

Though, in the embodiment described above, the reflecting means comprises the three reflecting mirrors 14A, 14B and 14C which are fixed to the base body 13, the reflecting means may be formed by forming three reflecting surfaces 20A, 20B and 20C on a single base body 20 as shown in FIG. 2.

In the embodiment described above, the light scanning system of the present invention is applied to a color recording system where the recording medium is scanned with a plurality of laser beams at different wavelengths. However the present invention may be applied to an image recording system where a plurality of laser beams at the same wavelength are caused to scan the recording medium in order to compensate for lack of power of each laser and even to an image reading system such as a radiation image reading system where a plurality of laser beams are caused to scan a stimulable phosphor sheet to read out a radiation image stored thereon.

What is claimed is:

1. A light scanning optical system comprising a plurality of lasers spaced from each other and a deflecting means which deflects laser beams emitted from the lasers so that the laser beams scan a recording medium while forming beam spots on the recording medium spaced from each other in the scanning direction characterized in that a reflecting means having a plurality of reflecting surfaces which are provided on a single base body to reflect the respective laser beams toward the deflecting means at different angles is disposed on the optical path of the laser beams between the lasers and the deflecting means.

2. A light scanning optical system as defined in claim 1 in which the lasers are positioned so that the laser beams emitted therefrom intersect each other before impinging upon the reflecting means, and the reflecting means reflects the laser beams so that the reflected laser beams impinge upon the deflecting means at angles to each other smaller than the angles at which the laser beams intersect each other before impinging upon the reflecting means.

3. A light scanning optical system as defined in claim 1 or 2 in which the base body of the reflecting means is formed of a material which is small in thermal expansion coefficient.

4. A light scanning optical system as defined in claim 3 in which said reflecting surfaces are provided by bonding reflecting members to the base body by adhesive which is small in thermal expansion coefficient or in thermal shrinkage coefficient.

5. A light scanning optical system as defined in claim 1 in which said lasers are SHG lasers.

* * * * *